United States Patent [19]

Mizuno et al.

[11] Patent Number: 5,201,119
[45] Date of Patent: Apr. 13, 1993

[54] METHOD OF MANUFACTURING AN ALUMINUM HEAT EXCHANGER

[75] Inventors: Hiroyoshi Mizuno, Anjo; Masayoshi Nishikawa, Kariya; Noriaki Kishi, Anjo; Hideaki Kaneko, Tokyo; Ryosuke Sako, Hiratsuka; Naomasa Shimotomai, Kawaguchi, all of Japan

[73] Assignees: Nippondenso Co., Ltd., Kariya; Nihon Parkerizing Co., Ltd.; San-Ai Oil Co., Ltd., both of Tokyo, all of Japan

[21] Appl. No.: 793,562

[22] Filed: Nov. 18, 1991

Related U.S. Application Data

[62] Division of Ser. No. 552,754, Jul. 16, 1990, Pat. No. 5,070,938.

[30] Foreign Application Priority Data

Jul. 17, 1989 [JP] Japan .................. 1-184329

[51] Int. Cl.$^5$ .............................................. B23P 15/26
[52] U.S. Cl. ............................ 29/890.047; 29/890.03; 165/133; 427/327
[58] Field of Search ................ 29/890.047, 890.03, 29/527.2; 165/133; 427/327, 435; 148/264

[56] References Cited

U.S. PATENT DOCUMENTS 3,900,689 8/1975 Deyrup .......................... 427/327
4,830,101 5/1989 Ohara et al.

FOREIGN PATENT DOCUMENTS 0200546 11/1986 European Pat. Off.
60-50397 3/1985 Japan.
61-250495 11/1986 Japan.

OTHER PUBLICATIONS

Patent Abstracts of Japan, vol. 9, No. 183 (M-400) [1906], Jul. 30, 1985; & JA-A-60 50 397 (Diesel Kiki K.K.) Mar. 20, 1985.
Patent Abstracts of Japan, vol. 11, No. 13 (C-397), Jan. 14, 1987; & JP-A-61 190 575 (Mitsubishi Heavy Ind., Ltd.) Feb. 20, 1985.
Patent Abstracts of Japan, vol. 12, No. 283 (C-518), Aug. 3, 1988; & JP-A-63 061 062 (Hitachi Ltd.) Sep. 1, 1986.

Primary Examiner—Irene Cuda
Attorney, Agent, or Firm—Cushman, Darby & Cushman

[57] ABSTRACT

A heat exchanger made of aluminum includes a plurality of tubes made of aluminum through which a fluid to be heat exchanged flows, the tubes having a metal surface of aluminum; fins made of aluminum arranged between the tubes for accelerating heat exchange between the fluid to be heat-exchanged and air, the fins having a metal surface of aluminum; a first protecting film of a chemical conversion coating formed on the metal surfaces of the tubes and fins and containing a metal component; and a second protecting film of an antimicrobial agent coating on the first protecting film, at least on the fins among the tubes and fins, the second protecting film having a chemical bond with the metal component of the first protecting film. An example of the antimicrobial agent is 2,2'-dithiobis(pyridine-1-oxide).

4 Claims, 2 Drawing Sheets

METHOD OF MANUFACTURING AN ALUMINUM HEAT EXCHANGER

This is a division of application Ser. No. 07/552,754, filed Jul. 16, 1990, now U.S. Pat. No. 5,070,938.

BACKGROUND OF THE INVENTION

1. Field of the Invention

The present invention relates to a heat exchanger made of aluminum (the term "aluminum" in the specification and claims of this application refers to metal aluminum as well as an aluminum alloy) and a method of manufacturing such a heat exchanger. A heat exchanger made of aluminum is suitable for an evaporator in a refrigerant circuit, such as an evaporator for an air conditioner of an automobile.

2. Description of the Related Art

Conventionally, an evaporator is designed to have a cooling part having as large an area as possible, to enhance the cooling effect and to make the gaps between fins as small as possible, and thus reduce the size of the evaporator. Accordingly, moisture in the air condenses in the gaps between the fins and the condensed water droplets cause a white rust corrosion. Further, since the atmosphere in the gaps between the fins is very humid, due to the condensed water, and the evaporator usually has a complex shape, dust in the air is easily deposited and accumulated on the fins. Accordingly, fungi are grown in the fin gaps and an unpleasant odor is given off by the fungi.

To solve these problems, the heat exchanger proposed in Japanese Unexamined Patent Publication (Kokai) No. 61-250495 (the application of which is the priority basis for Ohara et al. U.S. Pat. No. 4,830,101 is manufactured by a chemical conversion treatment of a surface of an aluminum-based metal body with a chromate, or a phosphate, etc. to impart a corrosion resistant coating on the metal body and then coating a resin layer on the chemical conversion coating to impart an hydrophilic property (wettability) thereto. The resin coating is a polymer having, many amino groups in the molecule. This prevents a corrosion caused by a deposition of condensed water on a surface of an aluminum body, and a growth of fungi due to the deposited water.

Optionally, an antifungal agent is added to the resin coating to inhibit a growth of fungi, or a deodorizer agent is added, to ensure the comfort of the user.

Nevertheless, it was found that the above resin coating containing a polymer having many amino groups in the molecule is not durable and cannot be used for a long time. The inventors carried out various experiments, and found from the results that the resin coating is only weakly bound to the chemical conversion coating. Accordingly, the resin coating is peeled off with a lapse of several years of use, and is dispersed as a fine powder. This fine powder irritates the olfactory organ of a user and produces an undesirable feeling of discomfort. The unpleasant odor is caused by not only the above fine powders but also fungi, and although an antifungal agent or a deodorizer is conventionally added to the resin coating to prevent a growth of fungi or an unpleasant odor, the antifungal agent or the deodorizer is also dispersed, together with the resin coating, in the air and thus are not adequate in practice.

The inventors first found that the unpleasant odor is caused not only by a growth of fungi but also by a remarkable growth of bacteria and yeast. Namely, it was not known that the main cause of the odor, other than the fine powder, is the fungi, and it also was not known that an unpleasant odor is formed by oxidation decomposition reactions of the bacteria and yeast. Hereinafter, fungus, bacteria and yeast are collectively referred to as a microorganism.

In this connection, 2,2'-dithiobis(pyridine-1-oxide) is known to have an antimicrobial effect, and therefore, is used in shampoos and soaps, etc.

The object of the present invention, in consideration of the above problems, is to provide an aluminum heat exchanger having a long lasting corrosion resistance, and on which a growth of microorganisms is inhibited for a long period, and to provide a method of manufacturing same.

SUMMARY OF THE INVENTION

The above and other objects of the present invention are attained by forming a first protecting film on a metal surface of aluminum defining tubes and fins, this first protecting film being a chemical conversion coating containing a metal element, and forming a second protecting film on the first protecting film on at least the fins, among the tubes and fins, the second protecting film being a coating of an antimicrobial agent and having a chemical bond with the metal element of the first protecting film.

The second protecting film may comprise a resin coating of an organic polymer.

The antimicrobial agent is preferably 2,2'-dithiobis(pyridine-1-oxide).

Also provided is a method of manufacturing an aluminum heat exchanger, comprising assembling tubes and fins made of aluminum to form a heat exchanger, immersing the assembled heat exchanger in an aqueous solution of a chemical conversion agent to form a first protecting film containing the chemical conversion agent on a metal surface of aluminum defining the tubes and fins, and immersing the heat exchanger having the first protecting film in an aqueous solution of an antimicrobial agent to form a second protecting film on the first protecting film, on at least the fins among the tubes and fins; the second protecting film being a coating of an antimicrobial agent and having a chemical bond with the first protecting film.

The amount used of the antimicrobial agent is preferably 0.2–1.0% by weight of the aqueous solution.

The antimicrobial agent is preferably coated on the first protecting film by adding same to an aqueous solution of an organic polymer, e.g., nylon, and immersing the heat exchanger having the first protecting film in this aqueous solution containing the agent and the organic polymer.

DESCRIPTION OF THE PREFERRED EMBODIMENTS

Figure 1:
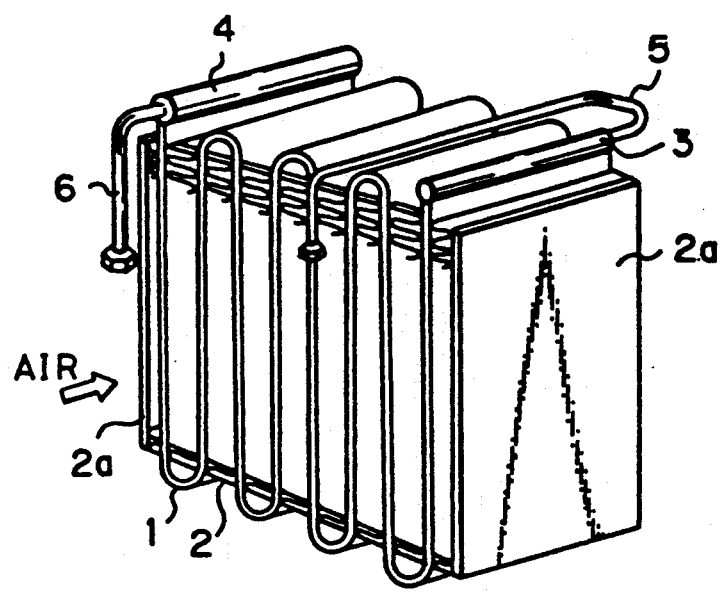
FIG. 1 is a perspective view of an evaporator for an automobile air conditioner to which the present invention is applied.

The chemical conversion treatment that can be employed in the present invention includes an alkali-chromate method, a chromate phosphate method, and a zinc phosphate method, which are typical aluminum surface treatment methods, a titanium or zirconium phosphate coating treatment, which is sometimes used as a chromium-free conversion method, and a chromic acid-containing-resin coating method.

The aluminum heat exchanger of the present invention can be used for various purposes. For example, an automobile heat exchanger is required to have a large heat exchanging capacity, be small and light, and have a high heat exchange efficiency, and further, the environment around the heat exchanger may be very severe. Therefore, an automobile heat exchanger requires a coating having a high corrosion resistance and capable of being uniformly applied to a complex shape. To attain the above requirements for an automotive heat exchanger, a chemical conversion treatment which forms a coating containing chromic acid as a main component is most preferable.

Once the above chemical conversion coating (first protecting film) is formed on the aluminum heat exchanger, an antimicrobial agent coating (second protecting film) is formed on the chemical conversion coating on the aluminum body, defining at least the fins among the tubes and fins.

The antimicrobial agent that can be used in the present invention should be effective against microorganisms (bacteria, fungi and yeast) growing on the heat exchanger, should be soluble in an acid solution, preferably, an aqueous phosphoric acid solution having a pH of 3–6, and should be able to be coated on the heat exchanger as a coating which is substantially in soluble in water, by immersing the heat exchanger in an aqueous solution of the agent and drying. To form a strong bond with the chemical conversion coating, the antimicrobial agent is preferably selected from those which are uniformly soluble in an acid solution and become insoluble and are deposited by a polyvalent metal ion. Since an aluminum heat exchanger is generally dried by heating, e.g., to 180° C. for 30 minutes, due to a complex shape thereof, the antimicrobial agent is preferably selected from among those which are resistant to a heat of, e.g., about 220° C. The number of antimicrobial agents meeting all of the above requirements is small, although the number which meet some of the requirements is large. A satisfactory example is 2,2'-dithiobis(-pyridine-1-oxide).

An aluminum heat exchanger having a chemical conversion coating is immersed in an aqueous solution of an antimicrobial agent having a concentration of 0.2–1.0% by weight. The aqueous solution is preferably a solution containing nylon. Once immersed, the chemical conversion coating is partially dissolved and a pH of the solution is increased (from 3 to 7) at an interface with the dissolved coating, and as a result, the antimicrobial agent is made insoluble in the aqueous solution and deposited on the chemical conversion coating. Here, the antimicrobial agent chemically reacts with the chemical conversion coating and forms an insoluble salt at the interface thereof.

The heat exchanger may be then dried, but may be water cleaned before drying so that an unreacted excess coating material can be removed and a more uniform coating can be obtained.

Since the antimicrobial agent is resistant to heat and is not affected by heat drying, a low molecular weight compound contained in the coating can be removed by the heat drying and a coating without an odor due to contamination can be obtained.

The antimicrobial agent may be added to a solution containing an organic polymer exhibiting a cationic characteristic and a tetravalent metal ion, to deposit an organic polymer containing a tetravalent metal ion together with the antimicrobial agent so that a coating having a hydrophilic property and capable of preventing an odor can be obtained. Such an organic polymer exhibiting a cationic characteristic that may be used in the present invention comprises, as the main ingredient, a polymer resin having many of amino groups —$NR_2$, where R stands for H, OH or alkyl, in the molecule.

In accordance with the present invention, the aluminum heat exchanger can be given a long-lasting corrosion resistance by forming a first protecting film on a metal surface of an aluminum body, whereby corrosion of the aluminum body is prevented. Furthermore, since the antimicrobial agent can be maintained in a good condition for a long time, because the bonds between a metal surface of an aluminum body and the first protecting film and between the first and second protecting films are firm, a growth of microorganisms in a heat exchanger can be prevented for a long time, and thus any unpleasant odor from the microorganisms can be reduced. Accordingly, the first and second protecting films are very useful and advantageous in practice.

The present invention will now be described with reference to examples.

FIG. 1 illustrates an evaporator for an automobile air conditioner, as an example of a heat exchanger according to the present invention. In the figure, reference numeral 1 denotes a flat perforated tube made of aluminum, JIS-A1050, JIS-A3003, or an alloy thereof with a minor amount of Cu, Mn, Fe, etc., formed by extruding and then bending into a serpentine form, and reference numeral 2 denotes corrugated fins made of aluminum, JIS-A1050, JIS-A3003, or an alloy thereof with a minor amount of Sn, Zn, etc., formed by bending.

Both surfaces of the fins 2 are clad with a brazing material such as JIS-A4004, JIS-A4343, etc. to form a brazing between the tube 1 and fins 2. Alternatively, fins 2 not clad with a brazing material may be used and the tube 1 covered with a brazing material. The numeral 2a denotes an end plate attached to the outermost fin 2.

Reference numeral 3 denotes a coolant delivery pipe disposed at a coolant inlet end of the tube 1, 4 a coolant collecting pipe disposed at a coolant exit end of the tube 1, 5 an inlet pipe for introducing a coolant into the coolant delivery pipe 3, and 6 an outlet pipe for discharging a coolant from the coolant collecting pipe 4. Note, all of these parts, i.e., the coolant delivery pipe 3, the coolant collecting pipe 4, the inlet pipe 5, and the outlet pipe 6, are made of aluminum.

Figure 2:
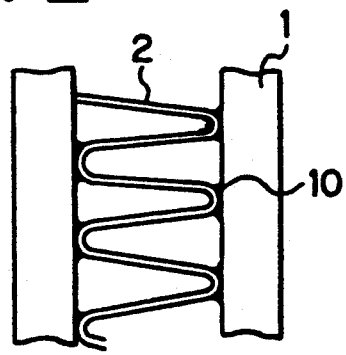
FIG. 2 is an enlarged view of a part of the evaporator shown in FIG. 1.

The aluminum heat exchanger shown in FIG. 1 is generally referred to as a serpentine-type unit, and the parts thereof are assembled in the form shown in FIG. 1 and brazed to form one body by vacuum brazing or atmosphere brazing. FIG. 2 shows the construction after the brazing of the tube 1 and the fins 2, wherein reference numeral 10 denotes brazing aggregates (fillets).

The surfaces of the brazed assembly of the heat exchanger are cleaned with water, etc., and then surface treatments are carried out to form coatings on the assembled heat exchanger.

Figure 3:
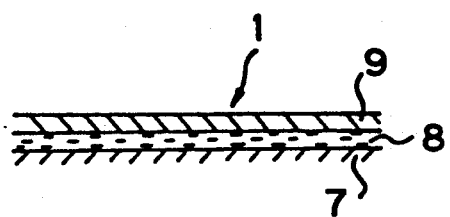
FIG. 3 is an enlarged sectional view of a surface portion of a tube shown in FIG. 2.

FIG. 3 shows the structure comprising an aluminum body 7 defining the tube 1, without a cladding a chemical conversion coating 8 formed on the metal surface of the aluminum body 7, and an antimicrobial agent coating 9 formed on the chemical conversion coating 8.

Figure 4:
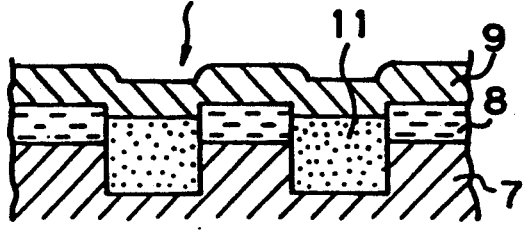
FIG. 4 is an enlarged sectional view of a surface portion of fins shown in FIG. 2.

FIG. 4 shows the structure comprising the fins 2 clad with a brazing material, whereby eutectic crystal material 11 is formed from aluminum contained in the fin body and silicon contained in the brazing material. The structure further comprises a chemical conversion coating 8 formed on the aluminum body 7 and the eutectic material 11, and an antimicrobial agent coating 9 formed on the chemical conversion coating 8.

The details of the surface treatments are described in the following.

EXAMPLE 1

A chromic acid chromate chemical conversion treatment agent for aluminum (Nippon Parkerizing K.K., Alchrom 20M) was diluted in water to 72 g/l and kept at 50° C., Then an assembled heat exchanger that had been cleaned as described above was immersed for 2 minutes in this aqueous solution, to form a chromic acid chromate chemical conversion coating having an amount of applied chromium of about 100 mg/m$^2$, followed by water cleaning.

Then, 2,2'-dithiobis(pyridine-1-oxide) was added to water in an amount of 0.5% by weight of the solution, adjusted to a pH of 3.0 by phosphoric acid, and kept at 30° C. The heat exchanger was immersed in this aqueous treatment bath at 30° C. for 0.5 minute, followed by drying with a fan dryer blowing a hot wind at 180° C., for 30 minutes, to deposit an antimicrobial agent coating on the chromate chemical conversion coating. The amount of deposited antimicrobial agent was formed to be 75 mg/m$^2$.

Figure 5:
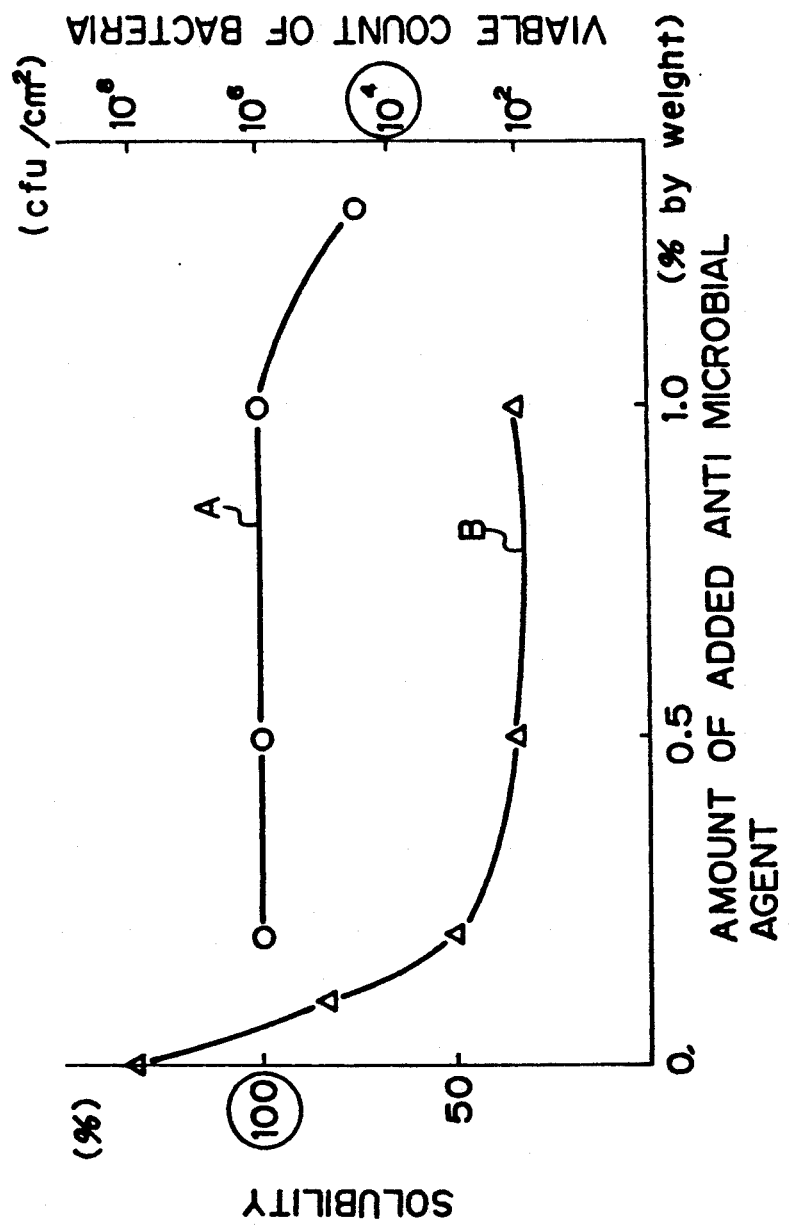
FIG. 5 shows relationships between the solubility and the added amount of an antimicrobial agent and between the viable count of bacteria and the added amount of an antimicrobial agent.

Preferably, the amount of an antimicrobial agent added is from 0.2–1.0% by weight of the solution. This is because, as seen from FIG. 5, the solubility of the agent, shown as the curve A in FIG. 5, is 100% in a range of the added amount of the agent of 0.2–1.0% by weight, where the solubility is calculated by (dissolved amount)/(added amount)×100, and when an odor from the bacteria is not present, the viable count of bacteria is less than 10$^4$ cfu/cm$^2$ (colony form unit/cm$^2$), which is attained in a range of the added agent of 0.15–1.0% by weight; the viable count of bacteria being shown as the curve B in FIG. 5 (the viable counts of fungi and yeast are similar to the viable count of bacteria, and thus are not shown in FIG. 5). Further, if the amount of the added agent is over 1.0% by weight, sedimentation occurs, which adversely affects the aesthetic appearance of the heat exchanger or causes process disadvantages, for example, clogging of a filter and an increase of the number of necessary cleaning steps. Further, the sedimentation of the agent is economically disadvantageous due to the high cost thereof.

The treated heat exchanger was immersed in sterile water for one week while tap water was allowed to flow thereover (hereinafter referred to as the flow water immersion test). This was an accelerated test which corresponds to a running of an automobile for about 60,000 km, or use of an automobile for about 5–6 years, containing an aluminum heat exchanger. After the test, the amount of remaining antimicrobial agent was measured, and was found to be 25 mg/m$^2$.

Then, microorganisms were applied to the treated aluminum heat exchanger. The microorganisms used were taken from an evaporator that had been worked and included the following:

Bacteria:
*Bacillus subtilis*, *Pseudomonas aeruginosa*, *Acinetobacter sp.*, *Enterobacter sp.*, *Alcaligenes sp.*, *Escherichia coli.*

Fungi:
*Aspergillus niger*, *Alternalia sp.*, *Penicillium, citrinum*, *Cladosporium sp.*, *Aureobasidium sp.*, *Penicillium sp.*, *Aspergillus sp.*

Yeast:
*Saccharomyces sp.*, *Rhodotolura sp.*

These microorganisms were cultivated until the number of microorganisms reached predetermined values (more than 10$^7$ cfu/ml for bacteria and yeast, and 10$^6$ cfu/ml for fungi), and were applied to the whole surface of the aluminum heat exchanger by spraying. The heat exchanger was then placed in a desiccator at 28°±2° C. for 10 days, and after the cultivation in the desiccator, the number of microorganisms was counted (viable count of microorganism) and the effects were confirmed by an organoleptic test.

The counting and evaluation were carried out as follows.

Count of number of microorganisms (viable count of microorganism)

After the cultivation, the evaporator was placed in sterile water to caused migration of the adhered microorganisms to the sterile water. A sample of 1 ml of the water was taken and the number of microorganisms counted. The results were then compared with those obtained from a control (an evaporator without an antimicrobial agent coating).

Organoleotic test

An organoleptic test by a panel of 10 members was carried out on odors coming from the above heat exchanger. The standards for this test were as follows.

| Rank | Odor |
| --- | --- |
| +1 | No odor |
| 0 | Odor difficult to detect |
| −1 | Slight odor |
| −2 | Unpleasant odor |
| −3 | Very unpleasant odor |
| −4 | Unbearable unpleasant odor |

Further, the hydrophilic property of the coating was measured by a goniometer-type contact angle measuring unit, and the corrosion resistance of the heat exchanger was evaluated by a salt spray test.

The treatments, the tests, and the results of the tests, are shown in the following Table 1.

As seen in Table 1, in the heat exchanger of Example 1 (treated in accordance with the present invention), the amount of antimicrobial agent coating remaining after the flow water test was 25 mg/m$^2$, and the number of bacteria, fungus and yeast was reduced to 3. 2×10$^2$ cfu/ml, 7.2×10 cfu/ml, and 6.5×10$^2$ cfu/ml, respectively. Accordingly, in accordance with the present invention, a growth of microorganisms can be inhibited, and thus an unpleasant odor generated by an oxidation decomposition due to the microorganisms is prevented for a long time.

EXAMPLE 2

An aluminum heat exchanger was treated to form a chromic acid chromate chemical conversion coating and then an antimicrobial agent coating, in the same manner as in Example 1, cleaned with water, and then dried under the same conditions as in Example 1. The amount of deposited antimicrobial agent was measured and was found to be 10 mg/m$^2$, and remained in an amount of 5 mg/m$^2$ after a flow water immersion test.

The results of the evaluations, carried out in the same manner as in Example 1, of this aluminum heat exchanger are shown in Table 1. As seen from Table 1, a growth of microorganisms and an unpleasant odor were prevented.

EXAMPLES 3-4

The procedures of Example 2 were repeated except that the time for which the heat exchanger was immersed to form an antimicrobial agent coating was 1 minute in Example 3 and 3 minutes in Example 4.

The results of the evaluation, carried out in the same manner as in Example 1, of this aluminum heat exchanger are shown in Table 1. As seen from Table 1, the amount of the deposited agent was increased with an increase of the treatment time, and thus it is considered that the agent is deposited as an insoluble material onto the chemical conversion coating.

EXAMPLE 5

An AB part and AC part of a phosphoric acid chromate chemical conversion treatment agent (Nippon Parkerizing K.K., Alchrom 701) were dissolved in water in 24 g/l and 1.3 g/l, respectively, and heated to 45° C., and a same heat exchanger as in Example 1 was immersed therein for about 90 seconds. The amount of deposited chromium was about 120 mg/m$^2$. The heat exchanger having a phosphoric acid chromate chemical conversion coating was then cleaned with water, and a same treatment as Example 3 was carried out to deposit an antimicrobial agent coating on the phosphoric acid chromate chemical conversion coating.

The results of the evaluation, carried out in the same manner as in Example 1, of this aluminum heat exchanger are shown in Table 1. As seen from Table 1, the amount of the agent was almost equal to that in Example 3.

EXAMPLE 6

After a chromic acid chromate chemical conversion coating was formed on a heat exchanger in the same manner as in Example 1, the heat exchanger was immersed in an aqueous solution containing a water-soluble polyamide and a zircon complex salt and supplemented with 0.5% by weight of 2,2'-dithiobis(pyridine-1-oxide), then dried and treated to codeposit an antimicrobial agent and a polyamide resin on the chromic acid chromate chemical conversion coating, in the same manner as in Example 1.

The results of the evaluation, carried out in the same manner as in Example 1, of this aluminum heat exchanger are shown in Table 1. As seen from Table 1, an antimicrobial agent effect equivalent to that in Example 1 was obtained, and the hydrophilic property was further improved.

COMPARATIVE EXAMPLE 1

A same heat exchanger as in Example 1 was treated with an antimicrobial agent in the same manner as in Example 1, but was not treated with a chemical conversion agent as in Example 1. The amount of deposited antimicrobial agent was 70 mg/m$^2$, but no antimicrobial agent was detected on the heat exchanger after the flow water immersion test (the agent was completely washed away).

COMPARATIVE EXAMPLE 2

The same treatment for an antimicrobial agent coating as in Comparative Example 1 was carried out, and then a water cleaning was carried out. The antimicrobial agent was completely washed away, i.e., no antimicrobial agent could be detected on the heat exchanger.

COMPARATIVE EXAMPLE 3

A 0.5 wt % aqueous solution of 2,2'-dithiobis-(pyridine-1-oxide) was adjusted to a pH of 8.0 and a heat exchanger treated with this solution to form an antimicrobial agent coating thereon in a manner similar to that of Example 1. As seen in Table 1, the deposited amount of the agent was not unformal, and although the agent after the flow water immersion test remained in a relatively large amount, in comparison with that of Example 1, the number of grown microorganisms was larger. Note, it was noticed that it was difficult to dissolve the antimicrobial agent in an aqueous alkali solution to uniformly disperse same.

COMPARATIVE EXAMPLE 4

The same heat exchanger and treatment solution as in Comparative Example 3 were used, and a treatment of an antimicrobial agent was carried out for 1 minute. After water cleaning, the amount of remaining antimicrobial agent was less than that of Comparative Example 3, as seen in Table 1.

COMPARATIVE EXAMPLE 5

A chromic acid chromate chemical conversion coating was formed in the same manner as in Example 1. Then the heat exchanger was immersed in a 0.5 wt % aqueous dispersion of thiabendazole (TBZ) as an antifungal agent for 1 minute, and without water cleaning, was dried in the same manner as in Example 1. Note, when the above aqueous solution containing 0.5 wt % antifungal agent (TBZ) was used, the agent was separated from and floated on the surface of the liquid.

The same tests and evaluations as in Example 1 were carried out and the results are shown in Table 1. As seen in Table 1, microorganisms were grown on the heat exchanger and an unpleasant odor was generated.

COMPARATIVE EXAMPLE 6

A heat exchanger treated with the chromate chemical conversion agent in the same manner as in Comparative Example 5 was immersed in the same TBZ solution as in Comparative Example 5, for 1 minute, and then water cleaned. As a result, as seen in Table 1, TBZ could not be detected.

COMPARATIVE EXAMPLE 7

This comparative Example corresponds to Japanese Unexamined Patent Publication (Kokai) No. 61-250495. An aluminum heat exchanger was treated with a chromic acid chromate chemical conversion agent to form a chromate chemical conversion coating on a metal surface of the aluminum body. The treated heat exchanger was immersed in an aqueous solution of a water soluble polyamide and a zircon complex salt having a pH of 3.0 for 1 minute, and the thus-treated heat exchanger was dried at 180° C. for 30 minutes.

The same tests and evaluations as in Example 1 were carried out and the results are shown in Table 1. As seen in Table 1, the amount of antimicrobial agent was measured, and no antimicrobial agent was detected.

The antimicrobial agent effect of the thus-treated heat exchanger was measured, and it was found that the number of microorganisms was very much higher than those of Examples 1-5 and that an unpleasant odor was generated in the organoleptic test.

Accordingly, it was found from this Comparative Example that, in the prior art, the resin coating formed on the chemical conversion coating is peeled off after a lapse of time (5-6 years) and, therefore, a growth of microorganisms occurs and an unpleasant odor is generated.

TABLE 1

| | Corrosion Resistance Coating First protecting film (Chemical conversion coating) | Conditions of treatment for second protecting appearance of the coating | | | | | | | Amount of deposited antimicrobial agent | | Antimicrobial agent effect (effect of preventing uncomfortable odor) | | | | Hydrophilic property Contact angle of water (degree) | Corrosion Resistance Time for appearing of white rust (H) |
|---|---|---|---|---|---|---|---|---|---|---|---|---|---|---|---|---|
| | | Composition of treating solution | pH | Appearance of treating solution | Temperature of treating solution | Time period of treating | Water cleaning Step | Conditions of Drying | Appearance of Coating | Initial value (mg/m²) | After flow water test (mg/m²) | Number of microorganism (cfu/ml) | | | Organoleptic evaluation | | |
| | | | | | | | | | | | | Bacteria | Fungus | Yeast | | | |
| Example 1 | Chromic acid chromate | 2,2'-dithiobis(pyridine-1-oxide) 0.5% by weight | 3.0 | Uniform transparent solution | 30° C. | 0.5 minute | Non | 180° C. × 30 minutes | Uniform | 75 | 25 | 3.2 × 10² | 7.2 × 10 | 6.5 × 10² | 0 | 60-80 | 240 |
| Example 2 | Chromic acid chromate | 2,2'-dithiobis(pyridine-1-oxide) 0.5% by weight | 3.0 | Uniform transparent solution | 30° C. | 0.5 minute | present | 180° C. × 30 minutes | Uniform | 75 | 25 | 3.2 × 10² | 7.2 × 10 | 6.5 × 10² | 0 | 60-80 | 240 |
| Example 3 | Chromic acid chromate | 2,2'-dithiobis(pyridine-1-oxide) 0.5% by weight | 3.0 | Uniform transparent solution | 30° C. | 1.0 minute | Present | 180° C. × 30 minutes | Uniform | 15 | 12 | 5.8 × 10² | 2.0 × 10² | 3.5 × 10³ | 0 | 60-80 | 240 |
| Example 4 | Chromic acid chromate | 2,2'-dithiobis(pyridine-1-oxide) 0.5% by weight | 3.0 | Uniform transparent solution | 30° C. | 3.0 minutes | Present | 180° C. × 30 minutes | Uniform | 20 | 17 | 4.0 × 10² | 1.3 × 10² | 2.0 × 10³ | 0 | 60-80 | 240 |
| Example 5 | Phosphoric acid chromate | 2,2'-dithiobis(pyridine-1-oxide) 0.5% by weight | 3.0 | Uniform transparent solution | 30° C. | 1.0 minute | Present | 180° C. × 30 minutes | Uniform | 15 | 14 | 4.5 × 10² | 1.7 × 10² | 3.0 × 10³ | 0 | 60-80 | 240 |
| Example 6 | Chromic acid chromate | 2,2'-dithiobis(pyridine-1-oxide) 0.5% by weight + water soluble | 3.0 | Uniform transparent solution | 30° C. | 1.0 minute | Non | 180° C. × 30 minutes | Uniform | 75 | 25 | 3.0 × 10² | 9.1 × 10 | 8.8 × 10² | 0 | ≦20 | 240 |

TABLE 1-continued

| | Corrosion Resistance Coating First protecting film (Chemical conversion coating) | Conditions of treatment for second protecting | | | | | | | Amount of deposited antimicrobial agent | | Antimicrobial agent effect (effect of preventing uncomfortable odor) | | | | Hydrophilic property Contact angle of water (degree) | Corrosion Resistance Time for appearing of white rust (H) |
|---|---|---|---|---|---|---|---|---|---|---|---|---|---|---|---|---|
| | | Composition of treating solution | pH | Appearance of treating solution | Temperature of treating solution | Time period of treating | Water cleaning Step | Conditions of Drying | Appearance of Coating | Initial value (mg/m²) | After flow water test (mg/m²) | Number of microorganism (cfu/ml) | | | Organoleptic evaluation | | |
| | | | | | | | | | | | | Bacteria | Fungus | Yeast | | | |
| Comparative Example 1 | — | 2,2'-dithiobis(pyridine-1-oxide) 0.5% by weight polyamide and zircon complex salt | 3.0 | Uniform transparent solution | 30° C. | 1.0 minute | Non | 180° C. × 30 minutes | Uniform | 70 | 0 | 4.5 × 10⁷ | 3.6 × 10⁷ | 1.5 × 10⁷ | −2 | 50–70 | 24 |
| Comparative Example 2 | — | 2,2'-dithiobis(pyridine-1-oxide) 0.5% by weight | 3.0 | Uniform transparent solution | 30° C. | 1.0 minute | Present | 180° C. × 30 minutes | — | 0 | — | 3.9 × 10⁷ | 4.5 × 10⁷ | 5.7 × 10⁷ | −2 | 50–70 | 24 |
| Comparative Example 3 | Chromic acid chromate | 2,2'-dithiobis(pyridine-1-oxide) 0.5% by weight | 8.0 | Opaque, partially sedimented | 30° C. | 1.0 minute | Non | 180° C. × 30 minutes | Ununiform | 60–80 | 10 | 5.8 × 10⁵ | 2.8 × 10⁵ | 3.2 × 10⁵ | −1 | 60–80 | 240 |
| Comparative Example 4 | Chromic acid chromate | 2,2'-dithiobis(pyridine-1-oxide) 0.5% by weight | 8.0 | Opaque, partially sedimented | 30° C. | 1.0 minute | Present | 180° C. × 30 minutes | Uniform | 3 | — | 2.8 × 10⁷ | 6.3 × 10⁷ | 9.7 × 10⁶ | −2 | 60–80 | 240 |
| Comparative Example 5 | Chromic acid chromate | Thiabendazole 0.5% by weight | 7.0 | Opaque, partially sedimented | 30° C. | 1.0 minute | Non | 180° C. × 30 minutes | Ununiform | 80 | 0 | 1.7 × 10⁷ | 5.8 × 10⁶ | 2.5 × 10⁶ | −2 | 60–80 | 240 |
| Comparative Example 6 | Chromic acid chromate | Thiabendazole 0.5% by weight | 7.0 | Opaque, partially sedimented | 30° C. | 1.0 minute | Present | 180° C. × 30 minutes | — | 0 | — | 2.0 × 10⁷ | 4.5 × 10⁷ | 3.0 × 10⁷ | −2 | 60–80 | 240 |
| Compar- | Chromic | Water | 3.0 | Uniform | 30° C. | 1.0 | Non | 180° C. × | Uni- | 0 | — | 2.7 × 10⁷ | 3.1 × 10⁷ | 1.9 × 10⁷ | −2 | ≦20 | 240 |

TABLE 1-continued

| | Corrosion Resistance Coating First protecting film (Chemical conversion coating) | Conditions of treatment for second protecting appearance of the coating | | | | | | | Amount of deposited antimicrobial agent | | Antimicrobial agent effect (effect of preventing uncomfortable odor) | | | | Hydrophilic property Contact angle of water (degree) | Corrosion Resistance Time for appearing of white rust (H) |
|---|---|---|---|---|---|---|---|---|---|---|---|---|---|---|---|---|
| | | Composition of treating solution | Appearance of treating solution pH | Temperature of treating solution | Time period of treating | Water cleaning Step | Conditions of Drying | Appearance of Coating | Initial value (mg/m²) | After flow water test (mg/m²) | Number of microorganism (cfu/ml) Bacteria Fungus Yeast | | | Organoleptic evaluation | | |
| ative Example 7 | acid chromate | soluble polyamide and zircon complex salt | transparent solution | | | | 30 minutes | form | minute | | | | | | | |

We claim:

1. A method of manufacturing a heat exchanger made of aluminum, comprising the steps of:
    assembling tubes and fins made of aluminum to form a heat exchanger, the tubes and fins having a metal surface of aluminum;
    immersing the assembled heat exchanger in an aqueous solution of a chemical conversion treatment agent to form a first protecting film on the metal surfaces of the tubes and fins; and
    immersing the heat exchanger having the first protecting film in an aqueous solution of an antimicrobial agent to chemically bond a second protecting film of an antimicrobial agent coating to the first protecting film formed on at least the metal surface defining the fins among the tubes and fins.

2. A method according to claim 1, wherein the aqueous solution of antimicrobial agent contains 0.2–1.0% by weight of the antimicrobial agent based on the solution.

3. A method according to claim 1, wherein the aqueous solution of antimicrobial agent further contains an organic polymer.

4. A method according to claim 1, wherein the antimicrobial agent is 2,2'-dithiobis(pyridine-1-oxide).

* * * * *

UNITED STATES PATENT AND TRADEMARK OFFICE
CERTIFICATE OF CORRECTION

PATENT NO. : 5,201,119
DATED : April 13, 1993
INVENTOR(S) : MIZUNO ET AL

It is certified that error appears in the above-indentified patent and that said Letters Patent is hereby corrected as shown below:

ON THE TITLE PAGE, ITEM [75] INVENTORS PLEASE DELETE:

"Masayoshi NISHIKAWA"
"Noriaki KISHI"

Signed and Sealed this

Thirty-first Day of May, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,201,119
DATED : April 13, 1993
INVENTOR(S) : Mizuno, et al

It is certified that error appears in the above-indentified patent and that said Letters Patent is hereby corrected as shown below:

On the title page, Item [75] Inventors: delete the following
inventors: Masayoshi NISHIKAWA
           Norinki KISHI Signed and Sealed this Twenty-sixth Day of July, 1994

Attest:

BRUCE LEHMAN

*Attesting Officer*  *Commissioner of Patents and Trademarks*